(12) United States Patent
Flanigan

(10) Patent No.: US 10,208,740 B2
(45) Date of Patent: Feb. 19, 2019

(54) RECIPROCATING REFRIGERATION COMPRESSOR SUCTION VALVE SEATING

(71) Applicant: Carrier Corporation, Farmington, CT (US)

(72) Inventor: Paul J. Flanigan, Cicero, NY (US)

(73) Assignee: Carrier Corporation, Palm Beach Gardens, FL (US)

(*) Notice: Subject to any disclaimer, the term of this patent is extended or adjusted under 35 U.S.C. 154(b) by 771 days.

(21) Appl. No.: 14/422,290

(22) PCT Filed: Jul. 1, 2013

(86) PCT No.: PCT/US2013/048877
§ 371 (c)(1),
(2) Date: Feb. 18, 2015

(87) PCT Pub. No.: WO2014/039153
PCT Pub. Date: Mar. 13, 2014

(65) Prior Publication Data
US 2015/0226193 A1    Aug. 13, 2015

Related U.S. Application Data

(60) Provisional application No. 61/696,729, filed on Sep. 4, 2012.

(51) Int. Cl.
*F16K 15/16*    (2006.01)
*F04B 39/10*    (2006.01)
(Continued)

(52) U.S. Cl.
CPC ...... *F04B 27/1009* (2013.01); *F04B 39/1066* (2013.01); *F04B 39/1073* (2013.01);
(Continued)

(58) Field of Classification Search
CPC ............. F04B 27/1009; F04B 39/1066; F04B 39/1073; F16K 15/144; F16K 15/185; Y10T 137/7879; Y10T 137/7837
(Continued)

(56) References Cited

U.S. PATENT DOCUMENTS 5,039,285 A * 8/1991 Lindstrom ............... F01M 1/08
184/6.8
5,171,137 A   12/1992 Todescat et al.
(Continued)

FOREIGN PATENT DOCUMENTS

| CN | 1057706 A | 1/1992 |
| JP | 2008069758 A | 3/2008 |
| WO | 2011084369 A2 | 7/2011 |

OTHER PUBLICATIONS

Chinese Office action for CN Patent Application No. 201380046116.2, dated Dec. 13, 2016.
(Continued)

*Primary Examiner* — Philip E Stimpert
(74) *Attorney, Agent, or Firm* — Bachman & LaPointe, P.C.

(57) ABSTRACT

A compressor valve plate (80) for a reed valve (94) has a mounting surface portion for mounting a base portion (104) of a reed (100). The compressor has a port (90). A seat (150) surrounds the port. A trepan (154) surrounds the seat. A relieved area (180, 182) less deep than the trepan extends proximally (182) of and distally (180) of the trepan. A reciprocating piston compressor comprises a valve assembly having such a compressor valve plate and a reed.

22 Claims, 11 Drawing Sheets

(51) Int. Cl.
*F04B 27/10* (2006.01)
*F16K 27/02* (2006.01)

(52) U.S. Cl.
CPC .......... *F16K 15/16* (2013.01); *F16K 27/0209* (2013.01); *Y10T 29/49236* (2015.01)

(58) Field of Classification Search
USPC .................. 137/511, 843, 855; 251/359, 368
See application file for complete search history.

(56) References Cited

U.S. PATENT DOCUMENTS

| | | | |
|---|---|---|---|
| 5,672,053 A | | 9/1997 | Sabha |
| 5,785,508 A | * | 7/1998 | Bolt .................... F04B 39/1073 137/855 |
| 5,884,665 A | * | 3/1999 | Thurston ............ F04B 39/1073 137/855 |
| 5,934,035 A | | 8/1999 | Rasmussen et al. |
| 5,960,825 A | | 10/1999 | Scancarello et al. |
| 6,102,680 A | * | 8/2000 | Fraser ................. F04B 39/1073 137/246 |
| 6,116,874 A | | 9/2000 | Nation et al. |
| 6,139,291 A | | 10/2000 | Perevozchikov |
| 6,164,334 A | | 12/2000 | Wallis |
| 6,293,774 B1 | | 9/2001 | Brabek |
| 6,309,194 B1 | | 10/2001 | Fraser et al. |
| 6,318,972 B1 | | 11/2001 | Huang et al. |
| 6,468,060 B1 | | 10/2002 | Dormer et al. |
| 6,540,492 B2 | | 4/2003 | Kaido et al. |
| 6,565,336 B1 | | 5/2003 | Fraser et al. |
| 6,592,346 B2 | | 7/2003 | Bushnell |
| 6,659,742 B2 | | 12/2003 | Oofuchi |
| 6,767,193 B2 | | 7/2004 | Hirose et al. |
| 6,823,891 B2 | | 11/2004 | Schulze et al. |
| 6,932,115 B2 | | 8/2005 | Kim et al. |
| 7,014,433 B2 | | 3/2006 | Nieter |
| 7,059,344 B2 | | 6/2006 | Shibamoto et al. |
| 7,198,475 B2 | | 4/2007 | Kim et al. |
| 7,364,413 B2 | | 4/2008 | Nieter |
| 7,390,176 B2 | | 6/2008 | MacBain et al. |
| 7,632,077 B2 | | 12/2009 | Tagami |
| 7,789,634 B2 | | 9/2010 | Higashi et al. |
| 7,802,972 B2 | | 9/2010 | Shimizu et al. |
| 7,866,961 B2 | | 1/2011 | Masuda |
| RE42,371 E | | 5/2011 | Peyton |
| 7,934,913 B2 | | 5/2011 | Iversen et al. |
| 8,197,240 B2 | | 6/2012 | Obara et al. |
| 2010/0129251 A1 | | 5/2010 | Endo et al. |
| 2011/0000069 A1 | | 1/2011 | Ramsdorf et al. |
| 2011/0150628 A1 | | 6/2011 | Wagner |
| 2012/0036993 A1 | | 2/2012 | Nieter |
| 2012/0301341 A1 | * | 11/2012 | Ota .................... F04B 27/1009 417/559 |

OTHER PUBLICATIONS

Seongwoo Woo et al., Reliability Design of the Newly Designed Reciprocating Compressor for a Refrigerator, Jul. 2006, International Compressor Engineering Conference, Purdue University, West Lafayette, Indiana.

International Search Report and Written Opinion for PCT/US2013/048877, dated Sep. 27, 2013.

Chinese Office action for CN Patent Application No. 201380046116.2, dated May 3, 2016.

Chinese Office action dated Jun. 1, 2017 for CN Patent Application No. 201380046116.2.

* cited by examiner

RECIPROCATING REFRIGERATION COMPRESSOR SUCTION VALVE SEATING

CROSS-REFERENCE TO RELATED APPLICATION

Benefit is claimed of U.S. Patent Application Ser. No. 61/696,729, filed Sep. 4, 2012, and entitled "Reciprocating Refrigeration Compressor Suction Valve Seating", the disclosure of which is incorporated by reference herein in its entirety as if set forth at length.

BACKGROUND

The present disclosure relates to refrigeration compressors. More particularly, it relates to displacement compressors (e.g., reciprocating piston compressors) utilized to compress gases such as low global warming potential (GWP) and natural refrigerants.

In a reciprocating compressor a piston head is driven between a lower position at which a fluid to be compressed enters the compression cylinder, and an upper or "top" position at which the compressed fluid is driven outwardly of the cylinder. A valve plate is typically placed at the top of the cylinder. The term "top" and "bottom" do not mandate any relative or absolute vertical orientation, but instead only to a relative position in the cylinder. The valve plate carries both inlet and outlet valves for allowing the flow of fluid into the cylinder, and out of the cylinder at appropriate points in the reciprocating movement of the piston. In reciprocating piston compressors and the like, pressure-actuated valves typically open and close once during each shaft revolution of the compressor.

Various types of valves are known, and various types of valve plates have been utilized. One type of compressor valving structure uses reed valves. A reed valve may cover a plurality of circumferentially spaced ports. When the valve closes, it contacts the valve seat due to valve stiffness and/or pressure actuation, thus sealing flow out of the cylinder for the suction valve, or into the cylinder for the discharge valve

SUMMARY

One aspect of the disclosure involves a compressor valve plate for a reed valve. The plate has a mounting surface portion for mounting a base portion of a reed. The compressor has a port. A seat surrounds the port. A trepan surrounds the seat. A relief (relieved area) less deep than the trepan extends proximally of and distally of the trepan.

In various implementations, there may be a plurality of said ports whose trepans are contiguous. The relieved area may have a span of at least 1.0 mm. The relieved area may have a depth of 0.1-0.3 mm. The relieved area may have a depth of 40-60% of a trepan depth.

Another aspect of the disclosure involves a compressor valve assembly comprising such a plate and a reed. The reed has a base mounted to the mounting surface portion and tip over the relieved area distally of the trepan.

In various implementations, the reed is a single reed mounted to control flow through the plurality of said ports. The tip may protrude over the relieved area by at least 1.0 mm or by at least 15% of a maximum transverse dimension of the port or by at least 75% of a trepan radial span.

Another aspect of the disclosure involves a compressor comprising such a compressor valve assembly. In various implementations, an electric motor may be within the case coupled to the crankshaft. The valve may be a suction valve. There may be a plurality of said ports whose trepans are contiguous. The reed may be a single reed mounted to control flow through the plurality of said ports.

A method for using the compressor may comprise running the compressor so that a closing of the reed causes the reed to be at least partially accommodated in the relieved area.

Another aspect of the disclosure involves a method for manufacturing such a compressor. The valve plate is a replacement for an existing valve plate lacking the relieved area or is formed by reengineering a configuration of such an existing valve plate.

Other aspects of the disclosure involve a refrigeration system including such a compressor. The refrigeration system may include a recirculating flowpath through the compressor. A first heat exchanger may be positioned along the flowpath downstream of the compressor. An expansion device may be positioned along the flowpath downstream of the first heat exchanger. A second heat exchanger may be positioned along the flowpath downstream of the expansion device. The refrigerant charge may comprise at least 50% carbon dioxide or fluorocarbon by weight. The system may be a fixed refrigeration system. The fixed refrigeration system may further comprise multiple refrigerated spaces. There may be a plurality of said second heat exchangers, each being positioned to cool an associated such refrigerated space.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
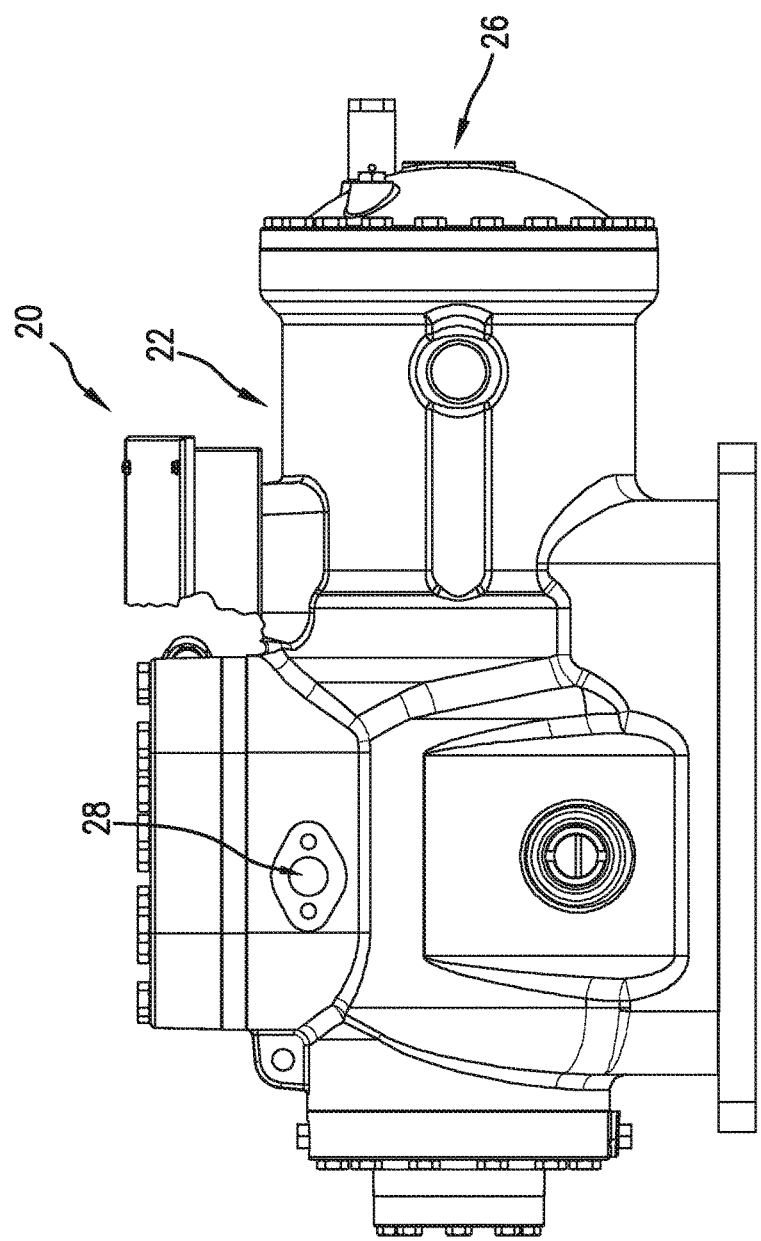
FIG. 1 is a side view of a compressor.
Figure 2:
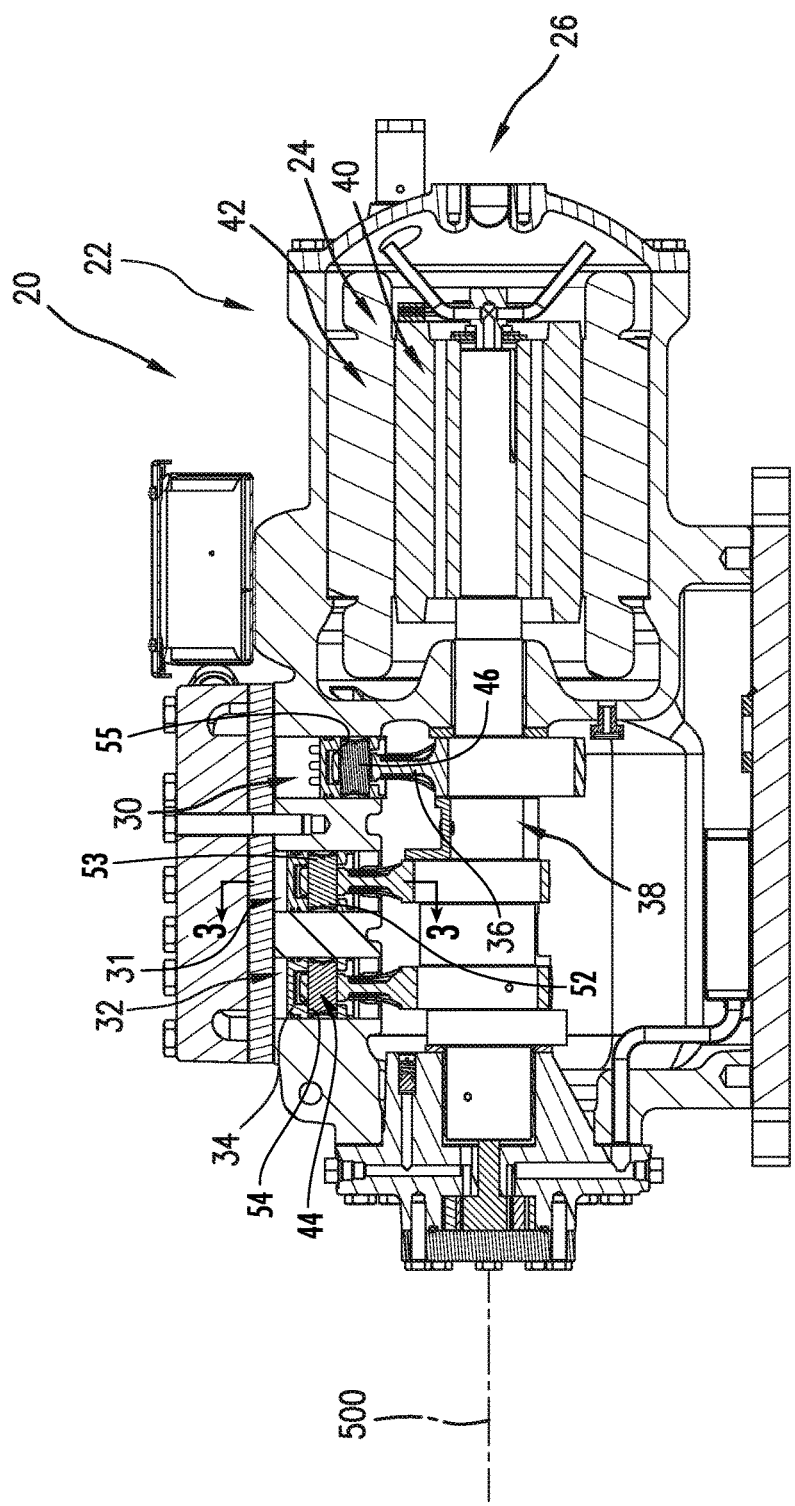
FIG. 2 is a vertical longitudinal sectional view of the compressor of FIG. 1.

FIGS. 1 and 2 show an exemplary compressor 20. The compressor 20 has a housing (case) assembly 22. The exemplary compressor includes an electric motor 24 (FIG. 2). The exemplary case 22 has a suction port (inlet) 26 and a discharge port (outlet) 28. The housing defines a plurality of cylinders 30, 31, and 32. Each cylinder accommodates an associated piston 34 mounted for reciprocal movement at least partially within the cylinder. Exemplary multi-cylinder configurations include: in-line; V (vee); and horizontally opposed. The exemplary in-line compressor includes three cylinders. Each of the cylinders includes a suction location and a discharge location. For example, the cylinders may be coupled in parallel so that the suction location is shared/common suction plenum fed by the suction port 26 and the discharge location is a shared/common discharge plenum feeding the discharge port 28. In other configurations, the cylinders may share suction locations/conditions but have different discharge locations/conditions. In other configurations, the cylinders may be in series. An exemplary fluorocarbon-based refrigerant is R-410A. An exemplary carbon dioxide ($CO_2$)-based (e.g., at least 50% $CO_2$ by mass/weight) refrigerant is R-744.

Figure 3:
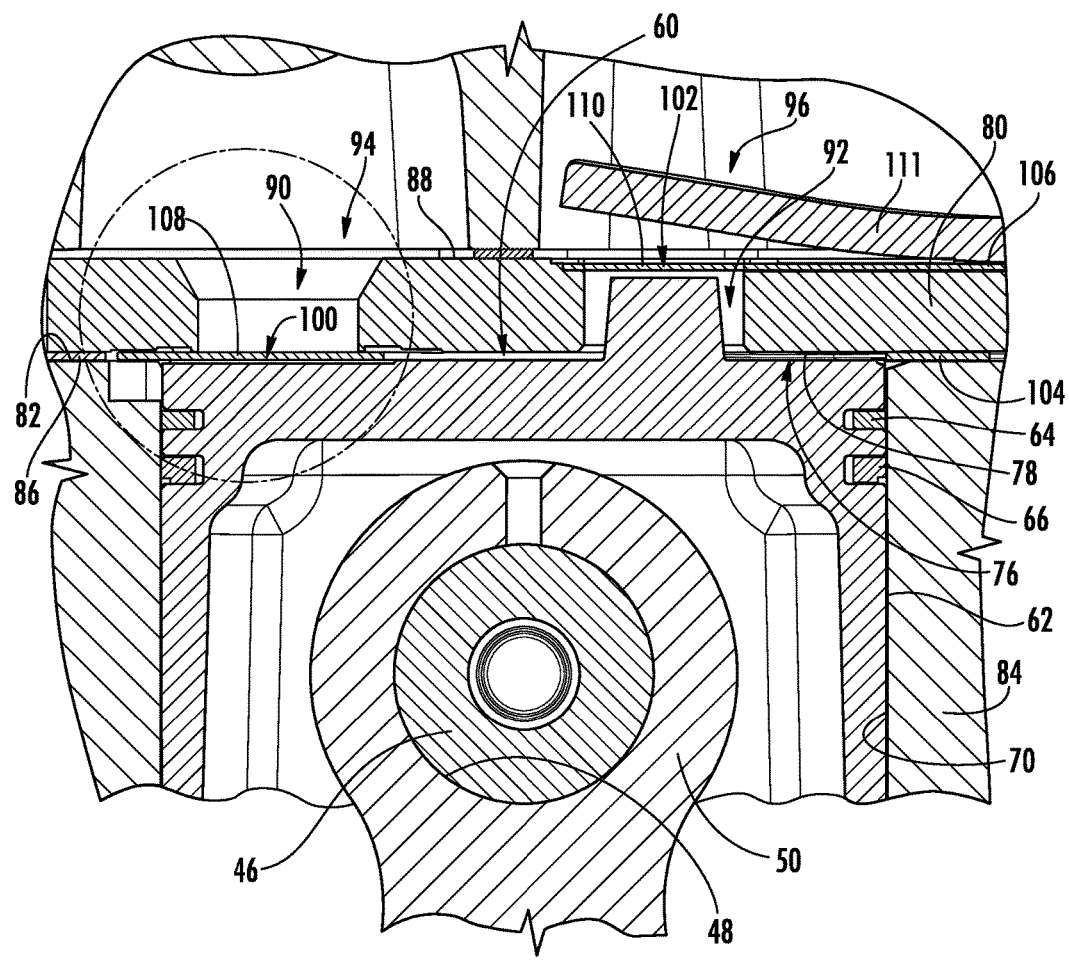
FIG. 3 is a partial vertical longitudinal sectional view of a cylinder of the compressor of FIG. 1.

Each of the pistons 34 is coupled via an associated connecting rod 36 to a crankshaft 38. The exemplary crankshaft 38 is held within the case by bearings for rotation about an axis 500. The exemplary crankshaft is coaxial with a rotor 40 and stator 42 of the motor 24. Each piston 30-32 is coupled to its associated connecting rod 36 via an associated wrist pin 44. FIG. 3 shows the pin 44 as having a central portion 46 mounted for rotation in an aperture 48 in a distal end portion 50 of the connecting rod 36. The exemplary aperture may be in a bushing (not shown) interference fit in a main piece of the connecting rod. The pin has first and second end portions 52 and 53 mounted in apertures 54 and 55 of associated receiving portions of the piston (e.g., via interference fit such as press fit or via a journaled fit).

The exemplary piston has a distal end face 60 (FIG. 3) and a lateral/circumferential surface 62. One or more sealing rings 64 may be carried in corresponding grooves 66 in the surface 62. The cylinders each have a cylinder wall/surface 70.

FIG. 3 shows a cylinder upper end/wall 76 formed by the underside 78 of a valve plate 80 (for a reed valve system). The exemplary valve plate 80 is mounted to the upper face 82 of a cylinder block 84 of the case with a gasket 86 in between for sealing.

Each cylinder has a plurality of inlet/suction ports 90 and outlet/discharge ports 92 extending through the plate 80 between the upper and lower surfaces thereof. Flows through the ports are controlled by valves. In this example, both inlet valves 94 and outlet valves 96 are reed valves. FIG. 3 further shows a suction valve reed 100 and a discharge valve reed 102. Each of the reeds has a proximal/base end portion (base) 104, 106 rigidly mounted to the case. Each of the reeds has a distal end portion 108, 110 which may shift via flexing of the reed to unblock the associated port and may relax to block the associated port. FIG. 3 further shows a discharge valve backer 111 to limit the range of flexing of the discharge valve reed.

Figure 4:
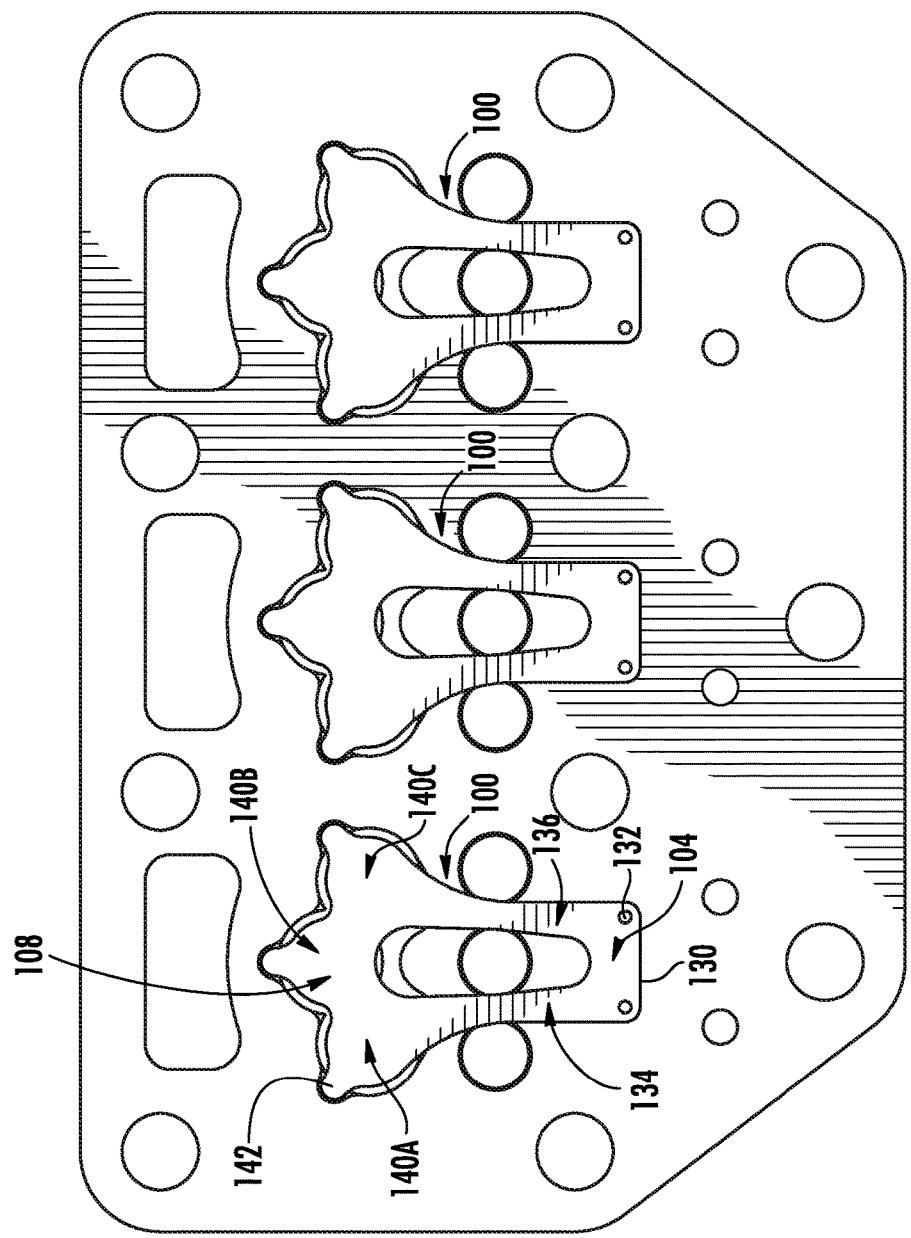
FIG. 4 is an underside view of a valve plate and suction valve reed assembly.

FIG. 4 is an underside view of the valve plate with just three suction valve reeds 100 mounted thereto. For ease of illustration, the discharge valve reeds and backers which would be seen below are not included. FIG. 4 is associated with an exemplary three-cylinder bank of cylinders. There may be one or more such banks of cylinders on a given compressor. Other numbers of cylinders are clearly possible.

Figure 5:
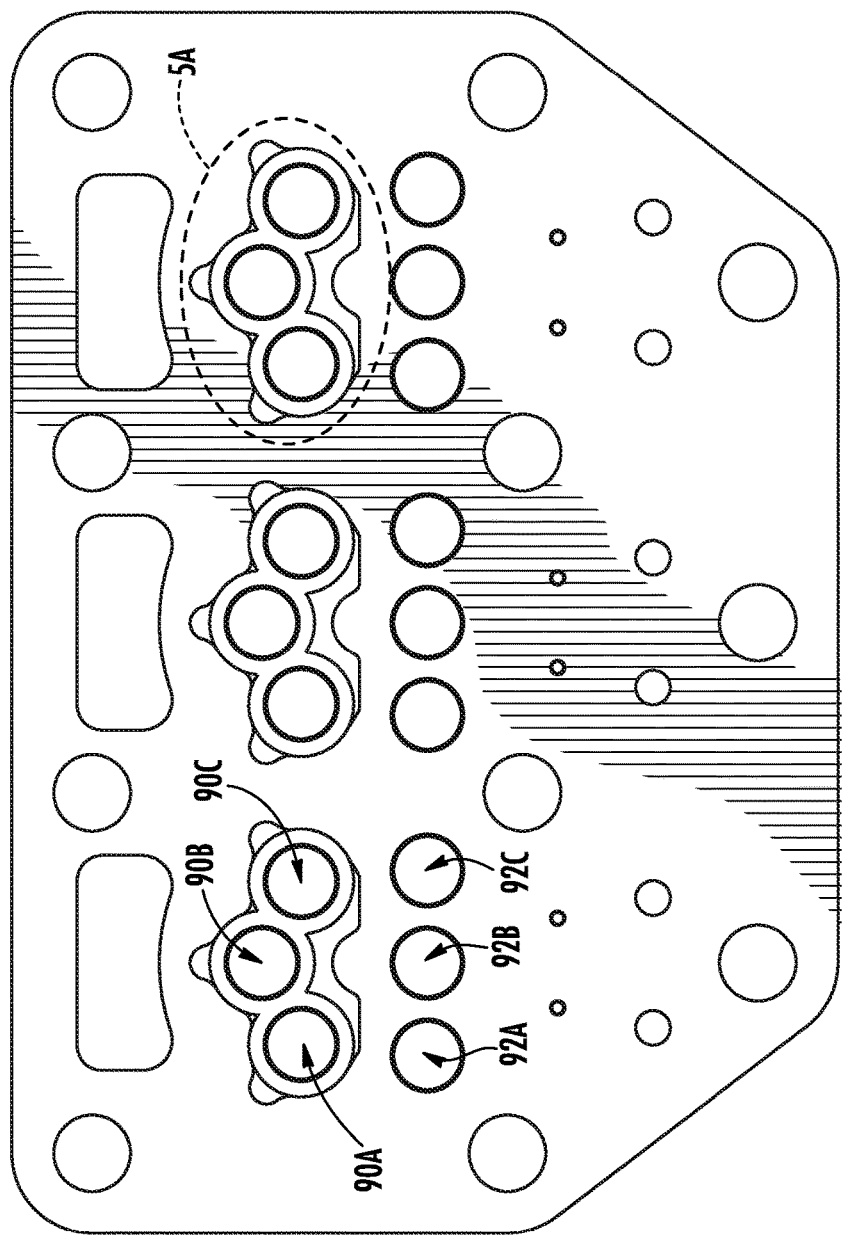
FIG. 5 is a view of the valve plate of FIG. 4.

FIG. 5 is a corresponding view of the plate alone. For each cylinder, there are three suction ports 90 (individually labeled as 90A, 90B, and 90C), and three discharge ports 92 (individually labeled as 92A, 92B, and 92C). FIG. 4 shows each reed 100 as blocking all three associated ports. The base 104 of the reed has an end/edge 130. The exemplary base 104 comprises a transverse web having a pair of apertures receiving dowel pins 132 for registering the reed with the plate. The pins 132 extend to corresponding apertures in the plate and may be press fitted flush to the reed. The exemplary reed has a pair of arms or branches 134 and 136 extending distally from the base 104 and respectively passing between adjacent discharge ports with 134 passing between 92A and 92B and 136 passing between 92B and 92C. These branches 134 and 136 rejoin at the distal end portion 108 which is formed with an exemplary three lobes 140A, 140B, and 140C (collectively and individually 140) respectively associated with the suction ports. Each of the lobes further comprises a generally circular main portion and a distally-projecting tip portion or tab 142. The exemplary lobe main portions merge with each other, with the main portions of the lobes 140A and 140C respectively merging with the branches 134 and 136 and the lobe 140B therebetween to join them.

Figure 3A:
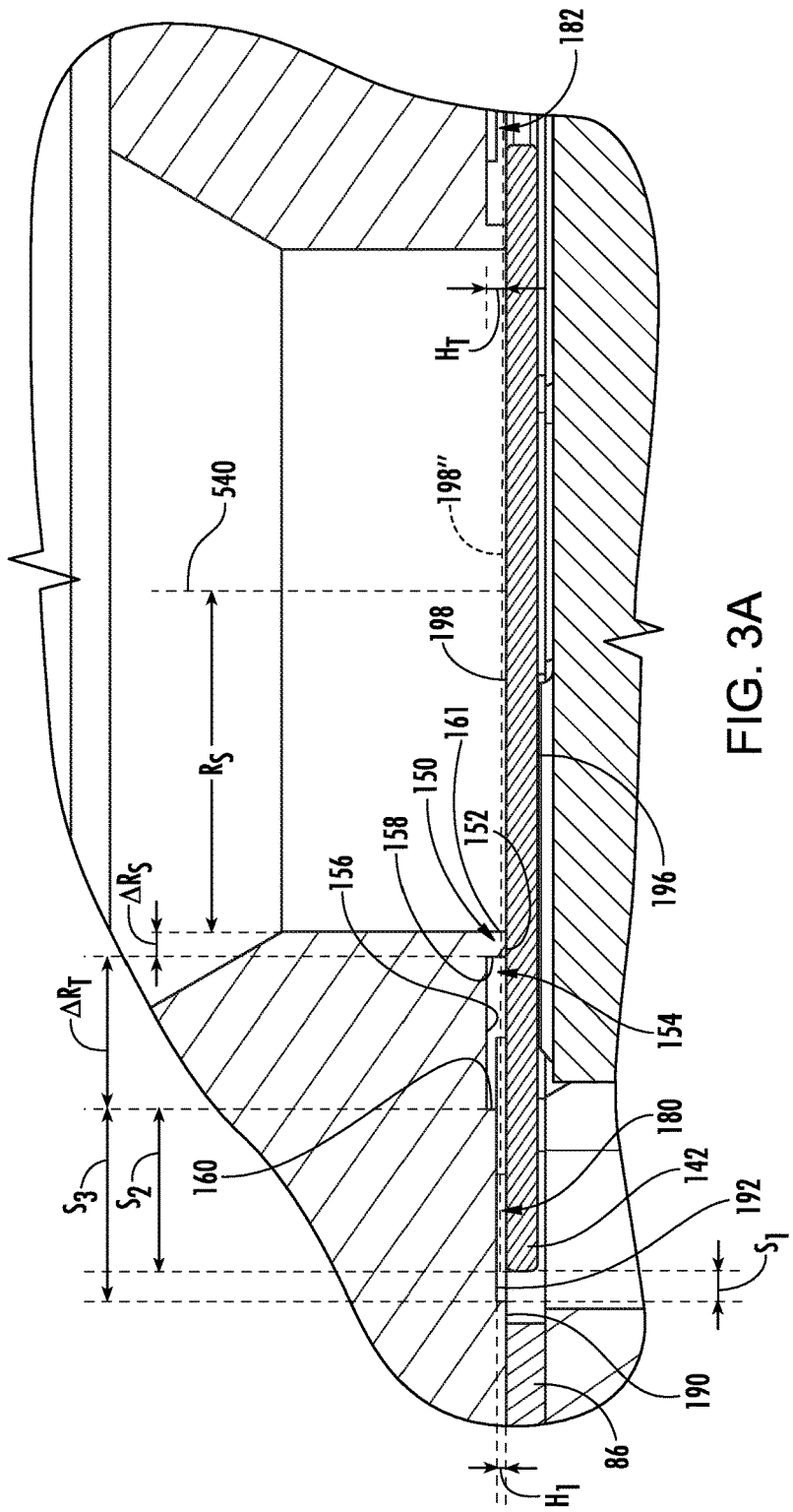
FIG. 3A is an enlarged view of a valve area of the cylinder of FIG. 3.
Figure 5A:
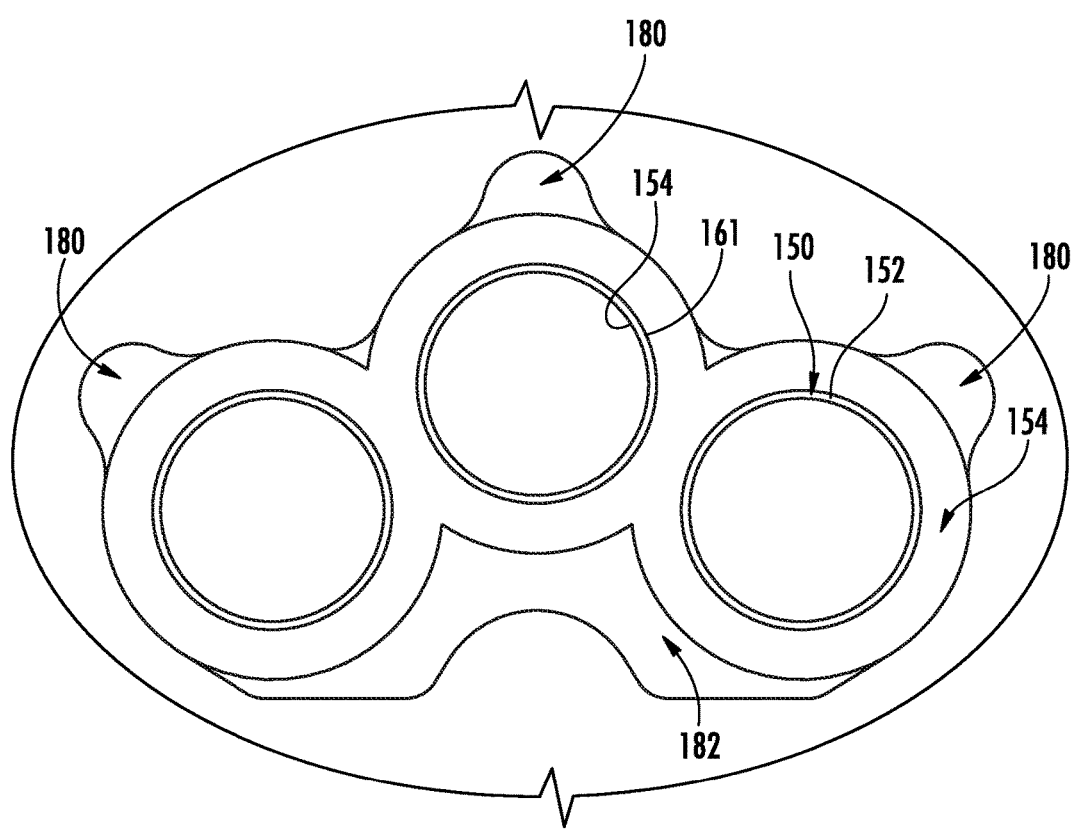
FIG. 5A is an enlarged view of a suction port group of the valve plate of FIG. 5.

FIG. 5A further shows each valve port as having an associated valve seat 150 circumscribing the associated port. The valve seat 150 has a rim 152 which may be formed as an intact portion of the flat lower surface of the original plate (e.g., the plate 80 may be machined from plate stock having two surfaces corresponding to the ultimate upper and lower surfaces). Each of the valve seats is surrounded by a trepan 154. The exemplary trepans are vertically relieved/machined areas. The exemplary trepans are annular with each trepan just merging with the trepan of the adjacent suction port. FIG. 3A shows the trepan as having a base surface 156 and extending from an inboard sidewall 158 (which forms an outer wall of the seat 150) to an outer sidewall 160. A depth of the trepan corresponds to the seat height $H_T$. FIG. 3A shows the port as having an axis 540 and a radius $R_S$ at the seat (along seat inner surface 161). FIG. 3 further shows a seat thickness or seat radial span as $\Delta R_S$. A trepan radial span is seen as $\Delta R_S$.

Figure 6:
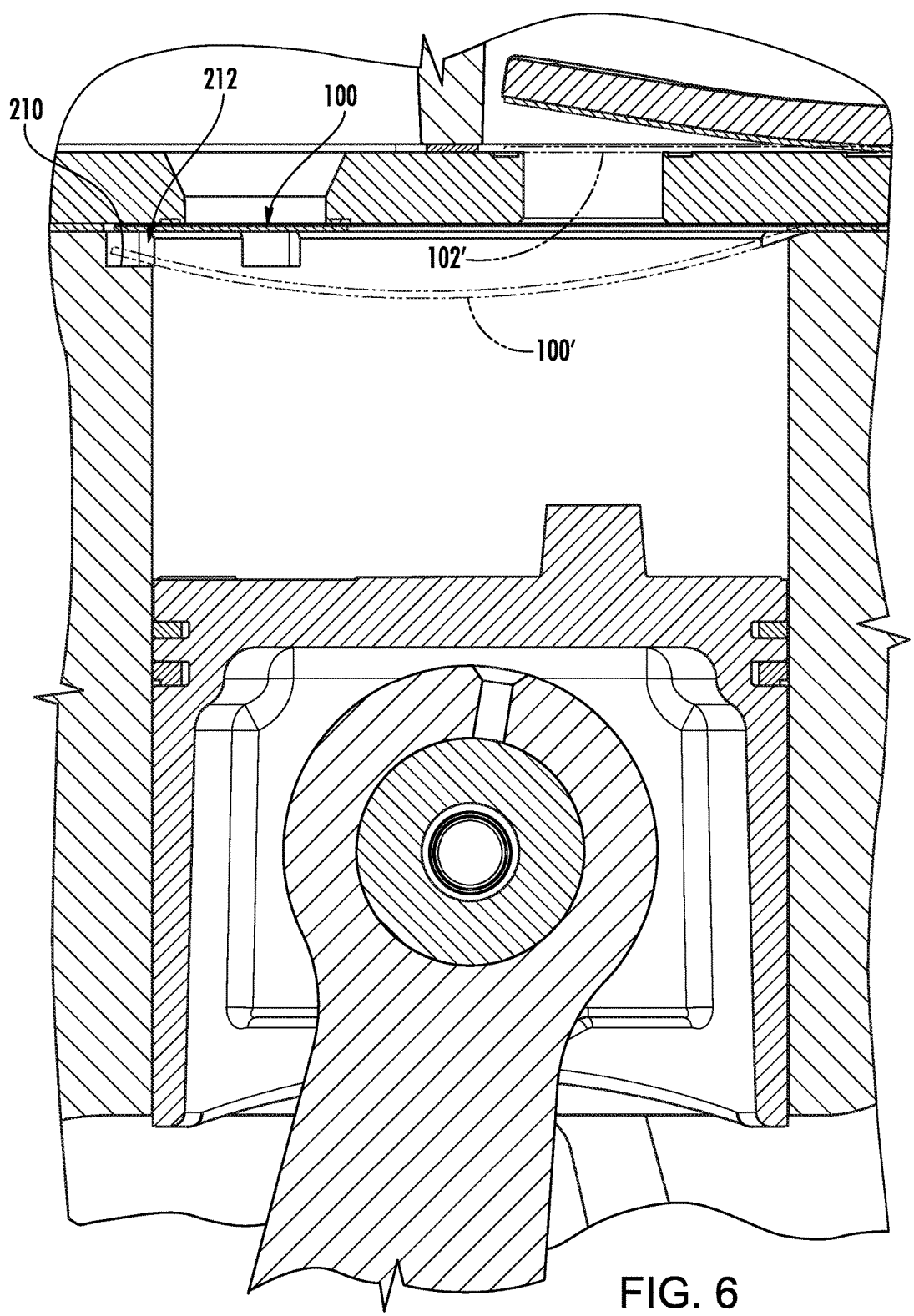
FIG. 6 is a view of the cylinder of FIG. 3 in an intermediate position with a compressing condition of the valves shown solid and an expanding/suction condition shown broken.

FIG. 6 is a view of the cylinder of FIG. 3 in an intermediate position with a compressing condition of the valves shown solid and an expanding/suction condition shown broken. In the expanding condition, the underside of the suction reed 100 (position 100') at the tips 142 is bottomed against the bases 210 of stop compartments 212 in the cylinder wall. The trepan limits contact between the valve and the plate (and defines the seat). By establishing a narrow seat, the trepan limits a contact area where there is likely to be an oil film. If there was a broad contact area at the port, the oil would cause stiction. By defining the seat, there is a more limited contact area around the port and much reduced stiction. The trepan width is effective to go slightly beyond the valve lobe planform at least away from the tabs and legs/arms. This helps break stiction when the valve is opening. The closed discharge valve reed is shown in broken line as 102' while shown open in solid line.

Figure 9:
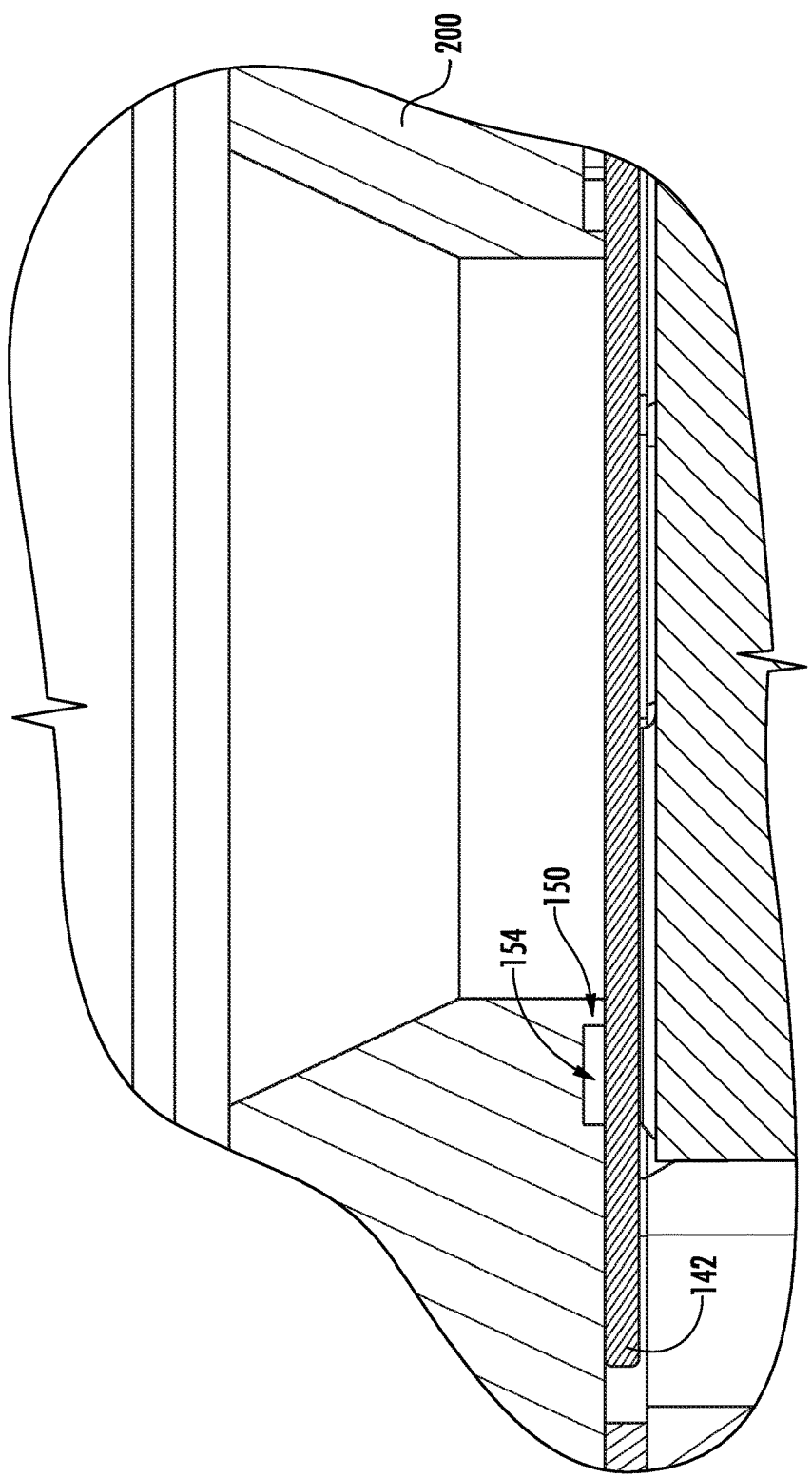
FIG. 9 is a partial vertical longitudinal sectional view of a cylinder of a prior art compressor.

FIGS. 3A and 5A show a relief (relieved area) 180, 182 outboard of the trepan. FIG. 9 shows a baseline valve plate lacking the relieved area. The relieved area may be added in a reengineering of the baseline compressor configuration. Additionally, it may be implemented in the remanufacturing of a compressor such as by replacing the baseline valve plate with the present valve plate. A minimal such reengineering or remanufacturing may preserve all other components. For example, identical reeds might be used in the reengineering or a remanufacturing.

In the exemplary FIG. 5A illustration, there is one relieved area distal portion (distal relief area) 180 for each of the seats extending generally distally and of complementary planform to the tab 142 of the associated reed lobe 140A-140C. The area 180 is slightly broader in planform so as to be able to receive the tab when the tab over flexes after snapping back into engagement with the seat from its open condition. FIG. 3A shows the areas 180, 182 as having a depth $H_1$ between an intact portion 190 of the plate lower surface and a base surface 192 of the relieved area. The exemplary $H_1$ is 10-90% of $H_T$, more narrowly, 30-70% or 40-60%.

FIG. 3A shows an exemplary spacing $S_1$ by which the relieved area is broader than the tab. Exemplary $S_1$ is 0.25-1.0 mm, more narrowly, 0.50-0.75 mm. Advantageously, $S_1$ is large enough so as to provide clearance between the edge of the valve and the valve plate at all possible conditions of misalignment between the two parts based on manufacturing tolerances. Further significant increase merely serves to increase clearance volume and undesirably reduce the volumetric efficiency. FIG. 3A shows an exemplary spacing $S_2$ by which the reed protrudes over the relieved area. Exemplary $S_2$ at the tip will depend on tip size (in turn determined by the desired tip loading against the stop (201 in FIG. 6). Exemplary $S_2$ at proximal portions will be coincident with the relieved area radial span or other thickness. Exemplary peak $S_2$ at the tips might be similar subject to the small clearance. Alternatively, such $S2$ may be at least 30% of $R_S$ (e.g., 15-40% of the port/seat diameter). FIG. 3A shows an exemplary spacing $S_3$ by which the relieved area is broader than the trepan (extends beyond the trepan). Exemplary $S_3$ is at least about 75%, more particularly 75-200% of the trepan radial span at the peak relieved area span locations (centrally aligned with the tips and at proximal ends of the lobes) more narrowly, 120-150%. The radial span of the relieved areas is smaller or nonexistent away from the tips/tabs and the proximal regions of the lobes (e.g., adjacent the tabs and along outboard sides of the outboard lobes). The exemplary relived area includes portions isolated at the two cusps between trepans distally thereof and the single proximal region spanning all three trepans. Exemplary $S_3$ is at least 1.0 mm and exemplary $H_1$ is 0.1-0.3 mm The exemplary relieved area proximal portions (proximal relief areas) 182 are of generally greater planform in the area of the two outboard ports in order to accommodate slight overflexing of the branches. Although the relieved area proximal portions are shown as of the same depth as the distal portions 180, given the nearer proximity to the base/root, there will be much less overflexing. Accordingly, these relieved areas might be of lower depth than the areas 180. Additionally, the possibility exists of having a slight variation in depth.

The relieved areas may serve one or more of several functions. They may improve valve seating by any of several mechanisms. First, they may reduce or eliminate the effect of any gas or lubricant film on portions of the reed away from the seat which might prevent full closing. Similarly, they may reduce the effect of any locally trapped debris. Additionally, wear on the seat and mating portion of the reed upper face might otherwise lead to slapping of the portion of the reed beyond the trepan against the intact surface of the plate (thereby reducing engagement forces with the seat or even leaving gaps). In a baseline compressor, this effect may be observed as wear on the tips of the reed and valve plate. The additional clearance zone, reduced or eliminates this. Additionally, the effects of valve plate and suction valve flatness, and any deflections that can occur due to pressure differentials may be reduced. For example, FIG. 3A shows the reed (via broken line upper surface 198") partially accommodated by the relieved area. The exemplary accommodation might be representative of a combination of a general recessing do to wear at the seat and a slight bending at the tip 142, thereby providing slightly deeper accommodation at the tip.

Figure 7:
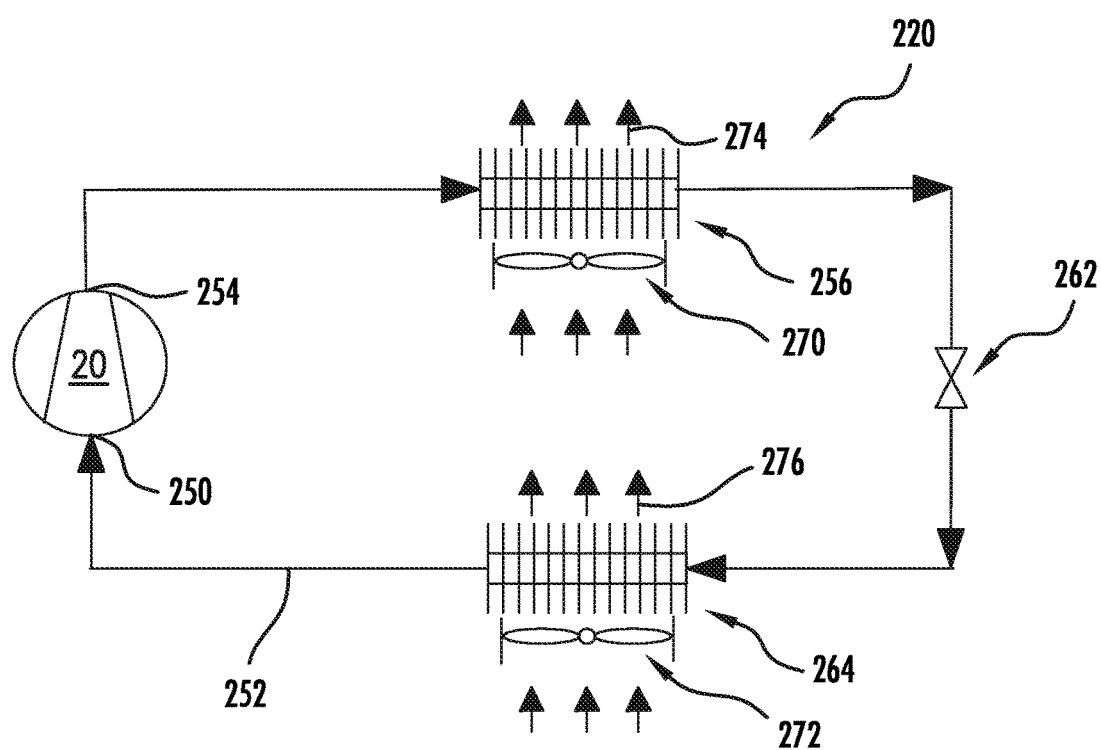
FIG. 7 is a schematic view of a refrigeration system.

FIG. 7 shows an exemplary refrigeration system 220 including the compressor 20. The system 220 includes a system suction location/condition 250 at the suction port 26. A refrigerant primary flowpath 252 proceeds downstream from the suction location/condition 250 through the compressor cylinders in parallel to be discharged from a discharge location/condition 254 at the discharge port 28. The primary flowpath 252 proceeds downstream through the inlet of a first heat exchanger (gas cooler/condenser) 256 to exit the outlet of the gas cooler/condenser. The primary flowpath 252 then proceeds downstream through an expansion device 262. The primary flowpath 252 then proceeds downstream through a second heat exchanger (evaporator) 264 to return to the suction condition/location 250.

In a normal operating condition, a recirculating flow of refrigerant passes along the primary flowpath 252, being compressed in the cylinders. The compressed refrigerant is cooled in the gas cooler/condenser 256, expanded in the expansion device 262, and then heated in the evaporator 264. In an exemplary implementation, the gas cooler/condenser 256 and evaporator 264 are refrigerant-air heat exchangers with associated fan (270; 272)-forced airflows (274; 276). The evaporator 264 may be in the refrigerated space or its airflow may pass through the refrigerated space. Similarly, the gas cooler/condenser 256 or its airflow may be external to the refrigerated space.

Additional system components and further system variations are possible (e.g., multi-zone/evaporator configurations, economized configurations, and the like). Exemplary systems include refrigerated transport units and fixed commercial refrigeration systems.

Figure 8:
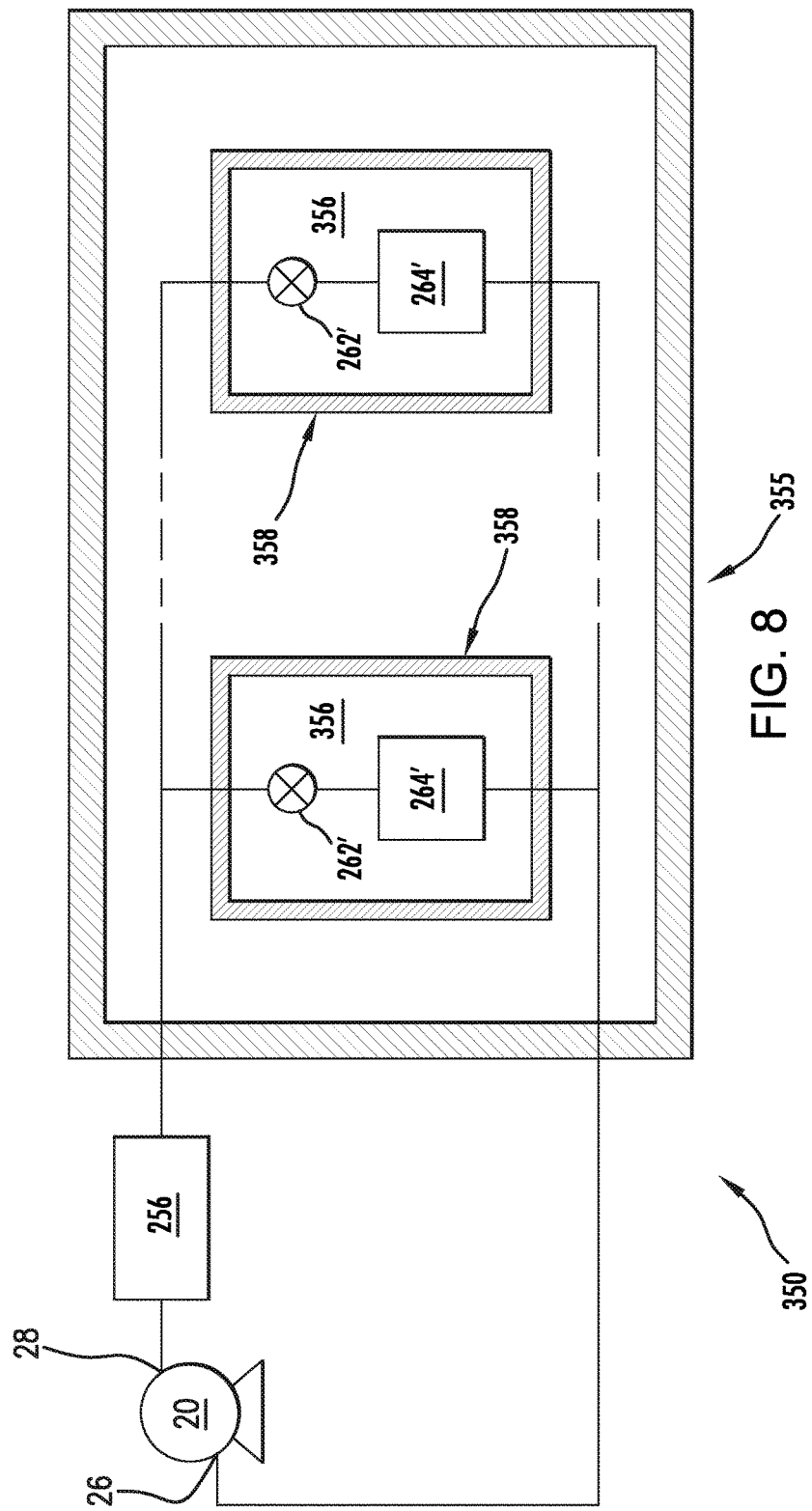
FIG. 8 is a schematic view of a fixed commercial refrigeration system.

An exemplary fixed commercial refrigeration system 350 (FIG. 8) includes one or more central compressors 20 and heat rejection heat exchangers 256 (e.g., rack-mounted outside/on a building 355) commonly serving multiple refrigerated spaces 356 (e.g., of retail display cabinets 358 in the building). Each such refrigerated space may have its own heat absorption heat exchanger 264' and expansion device 262' (or there may be a common expansion device). Other rack-mount situations include building heating, ventilation and air conditioning (HVAC).

The compressor may be manufactured via otherwise conventional manufacturing techniques. The pistons and cylinder block may be cast and machined as may other components. The valve plate may be machined from plate stock. The reeds may be cut from sheet stock.

Although an embodiment is described above in detail, such description is not intended for limiting the scope of the present disclosure. It will be understood that various modifications may be made without departing from the spirit and scope of the disclosure. For example, when implemented in the reengineering of an existing compressor configuration, details of the existing configuration may influence or dictate details of any particular implementation. Accordingly, other embodiments are within the scope of the following claims.

What is claimed is:

1. A compressor valve assembly comprising:
    a reed (100) having a base portion (104) and a tip (102); and
    a compressor valve plate (80) comprising:
        a mounting surface portion for mounting the base portion (104) of the reed (100);
        a port (90);
        a seat (150) surrounding the port;

a trepan (154) being an annular relief area fully surrounding the seat; and
a flat distal relief area (180) and a flat proximal relief area (182) each having a depth relative to the mounting surface portion less deep than the trepan, the proximal relief area extending proximally of the trepan and the distal relief area extending distally of the trepan with the proximal relief area (182) being between the seat and the mounting surface portion, said base portion (104) being mounted to the mounting surface portion, said tip (142) extending over the distal relief area, the distal relief area extending distally beyond an end of the tip.

2. The compressor valve assembly of claim 1 wherein:
there are a plurality of said ports whose trepans are contiguous; and
the reed is a single reed mounted to control flow through the plurality of said ports.

3. The compressor valve assembly of claim 1 wherein:
the tip protrudes over the distal relief area by at least about 1.0 mm.

4. A compressor (20) comprising:
a case (22) having a cylinder (30-32) and the valve assembly of claim 1;
a crankshaft (38);
a piston (34) mounted for reciprocal movement at least partially within the cylinder;
a connecting rod (36) coupling the piston to the crankshaft; and
a pin (44) coupling the connecting rod to the piston, the pin having: first (52) and second (53) end portions mounted in first (56) and second (57) receiving portions of the piston; and a central portion (48) engaging the connecting rod.

5. The plate of claim 4 wherein:
there are a plurality of said ports whose trepans are contiguous.

6. The plate of claim 4 wherein:
the combined distal and proximal relief areas have a span of at least about 1.0 mm.

7. The plate of claim 4 wherein:
the combined distal and proximal relief areas have a depth of about 0.1-0.3 mm.

8. The plate of claim 1 wherein:
the combined distal and proximal relief areas have a depth of about 40-60% of a trepan depth.

9. The compressor valve assembly of claim 4 wherein:
the tip protrudes over the distal relief area by at least about 15% of a maximum transverse dimension of the port.

10. The compressor of claim 4 wherein:
the tip protrudes over the distal relief area by at least about 75% of a trepan radial span.

11. The compressor of claim 4 further comprising:
an electric motor (24) within the case coupled to the crankshaft.

12. The compressor of claim 4 wherein:
the valve is a suction valve.

13. The compressor of claim 4 wherein:
there are a plurality of said ports whose trepans are contiguous.

14. The compressor of claim 13 wherein:
the reed is a single reed mounted to control flow through the plurality of said ports.

15. A method for using the compressor of claim 4 comprising:
running the compressor so that a closing of the reed causes the reed to be at least partially accommodated in the distal relief area.

16. A method for manufacturing the compressor of claim 4, wherein said valve plate is a replacement valve plate, the method comprising:
replacing an existing valve plate lacking the distal relief area and proximal relief area with said replacement valve plate.

17. A system (120; 250) comprising:
the compressor (20) of claim 4;
a refrigerant recirculating flowpath (152) through the compressor;
a first heat exchanger (156) along the flowpath downstream of the compressor;
an expansion device (162; 162') along the flowpath downstream of the first heat exchanger; and
a second heat exchanger (164; 164') along the flowpath downstream of the expansion device.

18. The system of claim 17 being a fixed refrigeration system further comprising:
multiple refrigerated spaces (256); and
wherein the second heat exchanger comprises a plurality of said second heat exchangers (164'), each being positioned to cool an associated said refrigerated space.

19. The compressor valve assembly of claim 4 wherein:
the reed has at least one arm (134, 136) extending distally from the base.

20. The compressor valve assembly of claim 4 wherein:
the tip projects distally from a circular main portion of a lobe (140) of the reed.

21. The compressor valve assembly of claim 20 wherein:
the distal relief area (180) portion positioned to receive the tip (142) during an overflexing thereof.

22. The compressor valve assembly of claim 1 wherein:
the reed has a lobe for sealing with the seat; and
the tip is a tab projecting distally from the lobe.

* * * * *